J. J. ROSE.
Automatic Brake for Wagons.
No. 216,897.  Patented June 24, 1879.
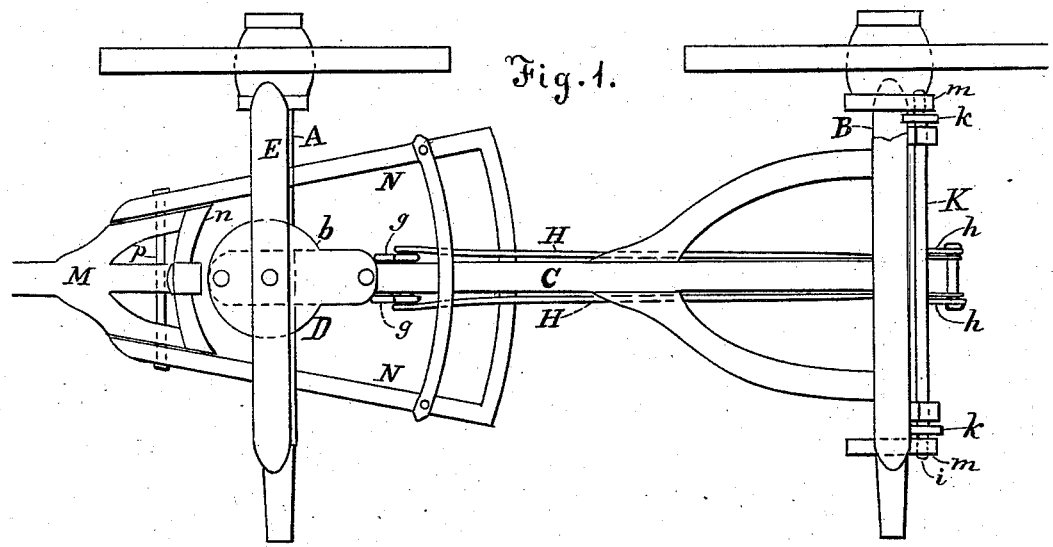
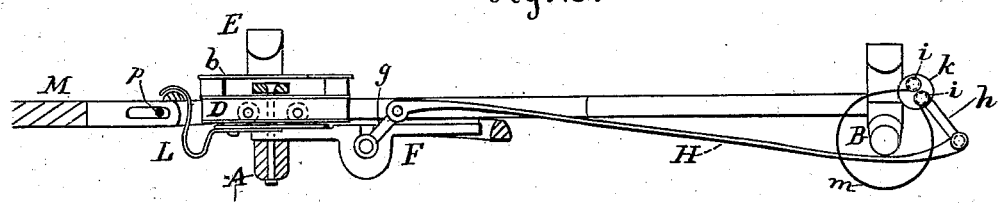
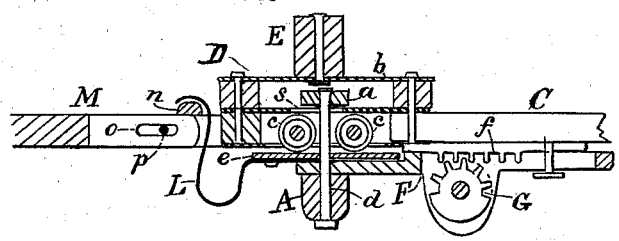
Witnesses:
Henry Orth
A. W. Bresford
Inventor:
John J. Rose.
By G. B. Towles.
Attorney.

UNITED STATES PATENT OFFICE.

JOHN J. ROSE, OF ELMWOOD, ILLINOIS.

IMPROVEMENT IN AUTOMATIC BRAKES FOR WAGONS.

Specification forming part of Letters Patent No. 216,897, dated June 24, 1879; application filed April 23, 1879.

*To all whom it may concern:*

Be it known that I, JOHN J. ROSE, of the town of Elmwood, in the county of Peoria and State of Illinois, have invented certain new and useful Improvements in Vehicle-Brakes; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to brakes for wagons and other vehicles; and consists in certain improvements in the construction of the same, as hereinafter shown and described, the object of this invention being to provide a brake which shall operate automatically and readily close against the wheels as the vehicle is going down a hill or inclined way, and which is unlocked when the vehicle reaches a level road by the ordinary draft of the vehicle.

In my construction the forward end of the reach has secured thereto a slotted attachment provided with rollers to rest on a plate fastened to the forward axle-tree, the king-bolt passing through the slot, so as to allow the reach a limited movement lengthwise. The forward bolster is secured to and held by another plate properly supported above the sand-board. The independent movement of the reach actuates the braking mechanism, which consists of a brake-shaft held at the rear of the running-gear, said shaft having a disk at each end rigidly attached, and having two pins or studs projecting outward. To these pins are secured the ends of a band, which passes around the hub of one of the hind wheels, the two disks being held near the hubs of the hind wheels. The brake-shaft connects by means of arms and rods with a small cog-wheel held by a slotted plate or frame a little in the rear of the forward axle-tree, to which the frame is fastened, the wheel connecting with a cog bar or rack fastened to the reach.

The braking is effected by turning or partially rotating the brake-shaft, by which the bands around the hubs may be contracted and closed against them. A contrary movement of the shaft releases the wheels.

The tongue or draft-pole is connected with the running-gear by means of a rod or bolt passing through slots, so that in backing the vehicle the tongue presses against the reach, and thus the brake may be unlocked.

In the accompanying drawings, forming a part of this specification, Figure 1 represents a plan of the running-gear of a vehicle with my improved brake applied thereto. Fig. 2 is a side view of the same, certain parts being removed. Fig. 3 shows, in section, the connection of the reach and front axle-tree.

A designates the front, and B the rear, axle-tree. C indicates the reach, having secured to its forward end the hollow attachment or reach-head D, provided with rollers $c$ and an opening at the bottom, so that the rollers may rest on a plate, $e$, fastened to the front axle-tree. E is the forward bolster, secured to a plate, $b$, properly supported above the sand-board $a$, which passes under it, as shown. The king-bolt $d$ passes through the part D, the latter having a slot, $s$, for such purpose, so that the reach has a limited movement endwise, and causes the brake to operate as hereinafter set forth. To the axle-tree A is secured the slotted plate or frame F, holding a small cog-wheel, G, which engages with a cog bar or rack, $f$, fastened to the reach, and two short arms, $g$, extend from the shaft of wheel G and are coupled to the rods H, extending to the rear of the running-gear, where they connect with the short arms $h$, rigidly attached to the brake-shaft K. The brake-shaft is secured in position at the rear, so that it may be partially rotated, and has fixed to each end a disk, $k$, having two fixed pins or studs, $i$, projecting outward, each disk being held near the hub of a hind wheel of the vehicle. To each of the pins $i$ is secured one end of a band, $m$, which passes around the hub at its inner edge, so that when the disk is turned by a movement of the brake-shaft in one direction the band $m$ is contracted and closes against the hub and stops the movement of the hind wheel.

L designates a spring secured to the plate $e$. It turns upward and hooks over a plate, $n$, fixed across the rear end of the tongue M, the latter being connected to the hounds N by means of the bolt $p$, which passes through the slots $o$. These slots are intended to allow the tongue to be pressed backward against the reach-head D, the spring L yielding to the pressure, this being one way of unlocking the brake. The spring serves to hold the tongue in its ordinary position, and also, in a measure, relieves the draft-animals from the weight of the tongue, the bolt $p$ acting as the fulcrum of a lever.

When the vehicle is descending a hill the hind wheels, sustaining the greater weight, naturally move forward faster than the fore wheels, so that the head D moves forward on the plate $e$, and the cog-wheel G, engaging with the rack $f$, moves the rods H forward, thus turning the brake-shaft, so as to close the bands $m$ against the hubs of the hind wheels. When the vehicle has reached the level road, the ordinary forward draft being resumed, the movement of cog-wheel G is reversed, and the rods H turn the brake-shaft in a contrary direction and relax the bands $m$ from the hubs, thus releasing the hind wheels.

When it is desired to unlock the brake without driving forward, it is easily done by backing slightly, the slots $o$ in the tongue allowing it to be moved back against the reach-head D without backing the front axle-tree, so that the cog-wheel G is rotated enough to turn the brake-shaft and relax the bands $m$ from the hubs.

I do not claim, broadly, a brake having a band held about the hub of a vehicle-wheel, and adapted to be closed against the hub by turning a shaft holding a disk with which the ends of the band are connected; but Having described my invention, I claim—

1. In the brake mechanism, the shaft K, having the disks $k$, holding the ends of bands $m$, and the fixed arms $h$, projecting from shaft K and connecting with rods H, in combination with the cog-wheel G, supported as shown, and the rack-bar fastened to reach C, the axis of wheel G having the arms $g$, connecting with said rods H, as and for the purposes set forth.

2. The reach provided with the head D, having the slot $s$ for the king-bolt, the rollers $c$, and the plate $b$, holding the bolster, in combination with the plate $e$, fastened to the forward axle-tree of the vehicle, as and for the purposes set forth.

3. The tongue or draft-pole connected with the vehicle by means of a bolt passing through slots in the tongue, as shown, and the plate $n$, secured to the tongue, in combination with the spring L, secured to the vehicle, substantially as set forth.

In testimony that I claim the foregoing as my own I affix my signature in presence of two witnesses.

JOHN J. ROSE.

Witnesses:
JAMES E. WAUGH,
W. L. VAN DERLIP.